United States Patent
Bishop

[15] 3,665,234
[45] May 23, 1972

[54] GENERATOR END WINDING SUPPORT

[72] Inventor: James S. Bishop, Schenectady, N.Y.
[73] Assignee: General Electric Company
[22] Filed: Dec. 14, 1970
[21] Appl. No.: 97,777

[52] U.S. Cl. .........................................................310/260
[51] Int. Cl. ......................................................H02k 1/24
[58] Field of Search...................310/270, 260, 269, 245, 231

[56] References Cited

UNITED STATES PATENTS

| | | | |
|---|---|---|---|
| 3,293,472 | 12/1966 | Stevens.................................. | 310/260 |
| 3,344,296 | 9/1967 | Coggeshall............................. | 310/260 |
| 2,565,139 | 8/1951 | Lessmann.............................. | 310/271 |
| 2,994,735 | 8/1961 | Marshall................................ | 310/260 |

FOREIGN PATENTS OR APPLICATIONS

| 1,366,320 | 6/1964 | France.................................. | 310/260 |

Primary Examiner—J. D. Miller
Assistant Examiner—R. Skudy
Attorney—William C. Crutcher, Frank L. Neuhauser, Oscar B. Waddell and Joseph B. Forman

[57] ABSTRACT

Support members and spacer blocks positioned between and supporting the conductors extending beyond the magnetic core of rotating electrical machinery. The members comprise a solid insulating member having a deformed surface sandwiched between a conformable absorbent material which is impregnated with a curable resin. Upon curing of the resin, the comformable absorbent material with the solid insulating member sandwiched therebetween provides a rigid support between the conductors which is conformable to the space therebetween and which has its structural elements locked together for increased durability.

2 Claims, 3 Drawing Figures

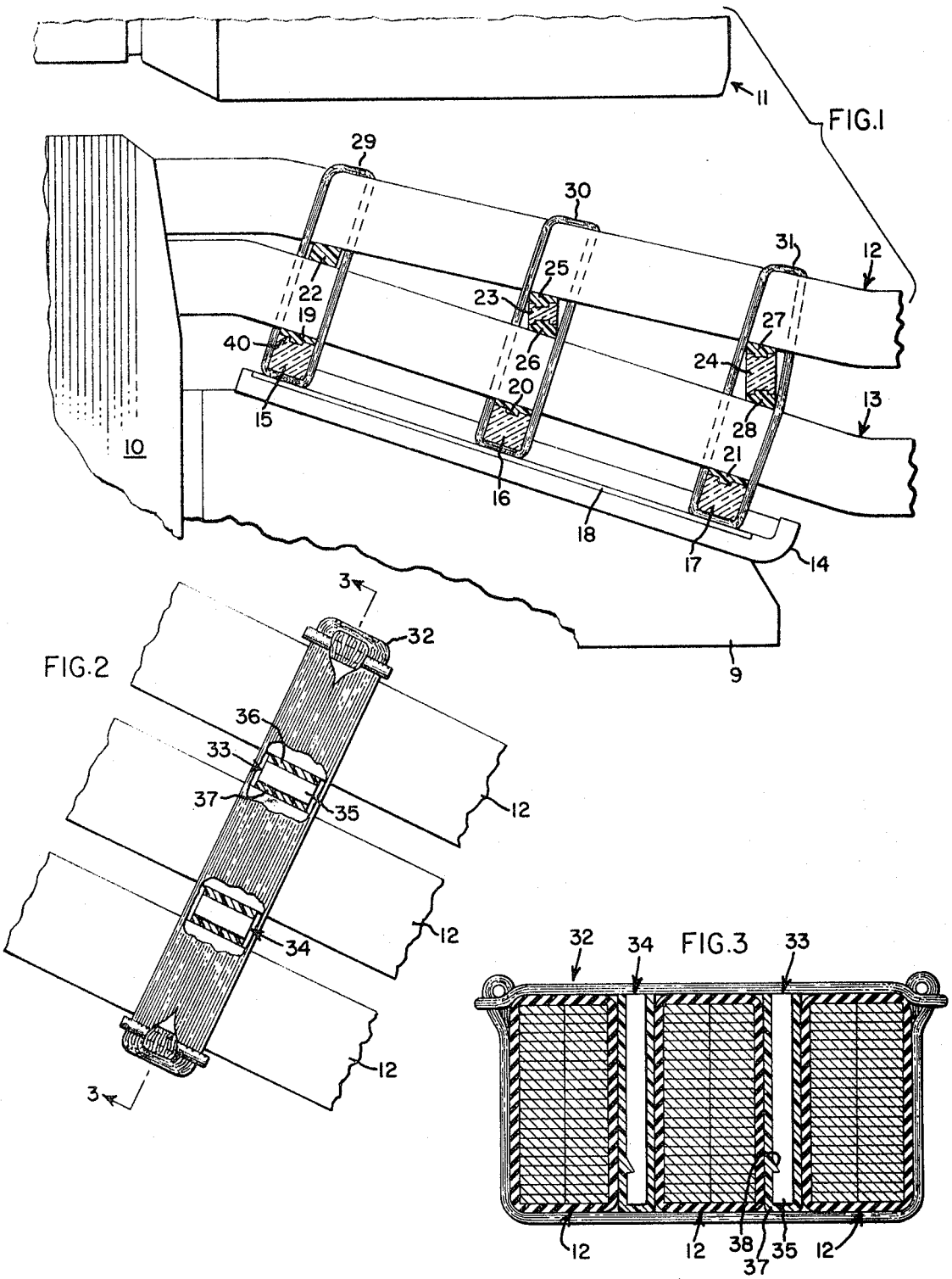
PATENTED MAY 23 1972
3,665,234
INVENTOR:
JAMES S. BISHOP,
BY W.C. Crutcher
HIS ATTORNEY.

GENERATOR END WINDING SUPPORT

BACKGROUND OF THE INVENTION

The invention relates generally to supporting and blocking structures, and more particularly to improved structures for the rigid support or blocking of spaced conductor members which are subject to forces tending to distort them and which are so arranged as to leave little room for elaborate support structure.

One environment for the use of this improved support is in electrical apparatus such as dynamoelectric machines or generators of high capacity. In the stator or armature windings of a generator there are high currents producing powerful magnetic fields which exert a force on any conductor in the magnetic field which has a current passing through it. The windings of a stator of a large generator carry high currents and are subject to strong magnetic forces. The windings in the body of the stator are held firmly within the stator slots by wedges and may withstand the strong forces without movement or adverse effect. However, the end portions of these windings which extend outside of the stator body present support problems.

The end turns of a dynamoelectric machine stator are the projecting portion of the armature bars which extend outwardly from longitudinal stator slots. The end turns are necessary in order to reverse the direction of the armature current flow through the stator assembly and to circumferentially displace a portion of the bar so that it can enter a slot approximately 150°, for a two-pole dynamoelectric machine, from the slot from which it emerged. The end turns must also diverge radially from the stator axis in order that they will not obstruct the rotor of the dynamoelectric machine which is turning in the stator bore. Consequently, the stator end turns assume a rather complicated configuration in that they are skewed with respect to the stator axis and lie generally tangentially about a frusto-conical surface of revolution concentric with the stator axis. When there are two separate armature bars in each slot, these being known as "top" or radially inner, and "bottom" or radially outer bars, one practice is to bend the top bars so that they lie tangentially in one direction about this frusto-conical surface and to bend the bottom bars in the opposite tangential direction about a surface of revolution. Furthermore, although the top and bottom bars are closely adjacent at the location where they emerge from the slot, they must spread radially with respect to one another as they move away from the stator so that space will be afforded for a series loop connecting a top bar to a bottom bar.

A suitable structure for supporting the insulated armature bars in the end turn region must afford a rigid support to counteract magnetic forces acting on the conductor bars. The support structure should be composed of as few parts as possible with all of the parts keyed or doweled together. Also, the parts or materials used should be non-abrasive and should be capable of conforming to the shape of the conductor bars so that no voids or clearances are formed between the support structures and the conductor bars. Preferably, the materials used to produce the conforming part of the support structure should be curable or hardenable at room temperature to avoid requirements of baking the whole generator and support structure in an oven. Furthermore, the support structure is preferably made of a dielectric material so as not to give rise to undesirable eddy currents or short circuits.

DESCRIPTION OF THE PRIOR ART

Previous support structures have included the use of resin impregnated fabric materials mounted between conductor bars to conform to the shape therebetween, and in one instance to the use of a pad of compressible absorbent material sandwiched between two relatively solid insulating members forced between conductor bars in order to provide blocking support therebetween. The pad of compressible absorbent material sandwiched between the two relatively solid insulating members in the prior art was impregnated with a thermosettable resin composition which hardened at room temperature. However, such prior art structure did not provide means to prevent the absorbent material from becoming detached from the solid insulating members should there be shrinkage or relative movements of the parts.

SUMMARY OF THE INVENTION

Briefly stated, the essence of this invention is a spacer block or support structure which comprises the use of a member of conformable absorbent material impregnated with a hardenable resin disposed between a deformed surface of a rigid or solid member and a conductor bar to be supported. The member therefore forms a rigid spacer block or support for the conductor bars in which no voids are formed between the support structure and the conductor bars although the shape of the conductor bars may vary. The elements are locked together by means of the conformable absorbent material hardening to a shape which complements that of the deformation formed in the solid member.

BRIEF DESCRIPTION OF THE DRAWINGS

While the specification concludes with claims particularly pointing out and distinctly claiming the subject matter which is regarded as the invention, it is believed that the invention will be better understood from the following description taken in connection with the accompanying drawings in which:

FIG. 1 is an elevation view partly in section showing the support system of this invention at one end of a generator stator, FIG. 2 is a top view partly in section showing the support structure of this invention as used in a portion of the end turn region of the armature bars of FIG. 1, and FIG. 3 is a cross sectional view of the invention taken along line 3—3 of FIG. 2.

DESCRIPTION OF THE PREFERRED EMBODIMENT

Referring now, more particularly, to FIG. 1 to illustrate the principles of the invention, there is shown an elevation view of a portion of a generator in which the invention may be used. There is shown a stator core assembly 10 with a rotor assembly 11 mounted to rotate within the stator core assembly 10. Extending from the stator core assembly 10 is the radially inner or top armature stator conductor bar 12 and radially outer or bottom conductor bar 13. These conductor bars 12 and 13 are bent radially outward as they leave the stator slots in order to accommodate the end supporting structure and to provide sufficient room for the rotor assembly 11. Furthermore, the inner or top bars are bent in one circumferential direction and the outer or bottom bars are bent in the other circumferential direction, not shown, so that each inner bar may be joined by a series loop with an outer bar emanating from a stator slot located 180° apart on the stator assembly circumference. In other words, an inner bar on one side of the stator circumference is connected with an outer bar diametrically opposite by a series loop. Each of these inner bars 12 and outer bars 13 must be rigidly supported to prevent movement due to the magnetic forces operating on them and must be sufficiently insulated from adjacent conductor bars.

There is shown in FIG. 1 a support member 14 which is rigidly mounted preferably to the stator core 10 by means well known in the art such as bracket 9. The support member 14 completes a full circle about the stator core 10 forming a frusto-conical surface upon which rings 15, 16 and 17 are mounted. The rings 15, 16 and 17 may be made of reinforced glass or any other suitable fairly rigid material, and may also preferably be made of an insulative material. The rings, if not perfectly manufactured, may be shimmed by any suitable shim material as shown at 18 in order to properly mount the rings 15, 16 and 17 on support member 14. A conformable absorbent material 19 impregnated with a resin which will cure at room temperature is mounted between a deformed surface or notch 40 on the inner circumferential surface of glass ring 15 and the bottom or outer radial stator bar 13. Similarly, conformable absorbent materials 20, 21 impregnated with resin are placed in similar notches in rings 16, 17. Any suitable conformable absorbent material such as a felt or woven body of an absorbent fibrous material such as glass or preferably an organic fiber manufactured by DuPont under the trademark Dacron may be used as the conformable absorbent material 19.

The conformable absorbent material may be impregnated with any suitable thermosetting resin which hardens upon curing, but preferably a resin is selected which will cure at room temperature and which does not require baking to harden. A number of well-known commercially available solventless thermosetting resins may be used in the practice of this invention, particularly those thermosetting resins that will harden at room temperature. The thermosetting resins that may be used include but not limited to polyester resins and epoxy resins. When the conformable material resin is cured, it becomes rigid and the deformed surface or notch 40 thereby prevents relative movements between members.

A similar process is carried out in forming the support structure between the lower conductor bars 13 and upper conductor bars 12. However, the space for the radial support structure between the upper conductor bars 12 and the lower conductor bars 13 and which is nearest the stator core assembly 10 may be insufficient to allow the use of a rigid or solid insulating ring. Therefore a support structure 22 may be formed from a strip of conformable absorbent material impregnated with a room temperature curable resin omitting the use of a rigid ring. The support structures between the lower conductor bars 13 and the upper conductor bars 12 in the two positions furthest removed from the stator core assembly 10 use rings of a suitable rigid material having deformed inner and outer circumferential surfaces such as shown at 23 and 24. These rings 23 and 24 are inserted between the upper stator conductor bars 12 and lower stator conductor bars 13, and a conformable resin impregnated material such as Dacron impregnated with a room temperature curable resin is inserted as shown at 25, 26, 27 and 28. The stator bars 12 and 13 are then bound together by glass or other suitable roving material as shown at 29, 30 and 31 to provide a rugged support structure in the radial direction.

Referring now more particularly to FIG. 2, there is shown a top view of a set of three inner radial or top stator conductor bars 12. It is to be understood that FIG. 2 would be equally applicable to a description of the support structure between the outer radial or bottom stator conductor bars 13 since the support structure between the bottom stator conductor bars 13 would be identical. A tension member 32 is shown binding together a number of top stator bars 12. The tension member 32 is made in two parts, an upper and lower half or part, which are fastened together by pin means in order to facilitate the assembly of the support structure. A suitable construction and method for attaching the tension members 32 is disclosed in U.S. Pat. No. 3,135,888 issued to A. D. Coggeshall on June 2, 1964 and incorporated by reference herein.

Also shown in FIG. 2, through cut out sections of tension member 32, are blocking members 33 and 34 between the top stator conductor bars 12. These blocking members 33 and 34 are identical and will therefore be discussed only in terms of spacer block 33. The block 33 includes a central member of any suitable rigid or solid material 35 and may be preferably a cotton polyester laminate such as one manufactured by the General Electric Company under the trademark of Textolite. The solid or rigid material 35 is sandwiched between Dacron felt or any other suitable conformable absorbent material impregnated with a room temperature curable resin as shown at 36 and 37.

In FIG. 3 there is shown a cross sectional view taken along line 3—3 of FIG. 2 in which there is shown three top stator conductor bars 12, tension member 32 and spacer blocks 33 and 34. As shown in FIG. 3, the rigid solid material 35 has a notch or fish hook 38 formed in at least one surface so that upon hardening of the resin in the conformable absorbent material 37, the parts or elements of the block will be locked together against relative movements. A convenient method of assembly of the block components between the top bars may be described in terms of block 33 since block 34 is identical to the block 33. As mentioned supra, the lower half of the tension member 32 is mounted under the conductor bars 12 prior to placing the resin impregnated material 22, 25 and 27 in position. A "U" shaped conformable absorbent material 37 is inserted between a pair of top stator conductor bars 12 after being impregnated with a resin curable at room temperature. However, it is equally feasible to mount the conformable absorbent material 37 in a "U" shape between the top stator conductor bars 12, and then, after assembly, to spray the material 37 with a curable resin. The rigid member 35 with a fish hook or other suitable depression or surface deformation 38 is then forced into the center of the "U" shaped conformable material 37. The remaining blocking members such as 34 are assembled in similar fashion. The tension member 32 is then used to place the assembly under tension according to the aforementioned Coggeshall patent, and the support structure assembly is then left to stand for a suitable period of time until the resin hardens.

An alternate method of application consists of applying a long strip of absorbent material across several spaces to be blocked, and then inserting several rigid members in sequence, so that each rigid member forms a "U" shaped cavity by wedging action. The remainder of the operation is the same as before.

It is to be appreciated that an important aspect of the invention is the use of a conformable material in conjunction with a rigid material wherein the conformable material is placed in contact with the conductor bars which may not all be shaped identically and therefore will provide complete contact between the support structure and the conductor bars to provide a stronger and more durable support structure. Another aspect of the invention which is equally important is that the conformable material which is impregnated with a hardenable resin and the rigid support member may be locked in position by means of a "fish hook," notch with a barb, or other suitable deformation in the surface of the rigid member thereby forming a rigid support structure better adapted to withstand the forces acting against the support structure over long periods of time and to resist deterioration of the support structure due to constant vibration over long periods of time.

It will be apparent to those skilled in the art that the blocking and support structure described herein may be used to space or to support conductors in any apparatus in which the spacing of the conductors provide little room for a sturdy support structure. It is also apparent that various changes and modifications may be made in the structure, or different materials used to produce the same result in the structure. For example, a proturberance on the rigid member which is sandwiched between the conformable absorbent material could be used in place of the notch or depression used to lock the elements of the support structure together.

In view of the above, it will be apparent that modifications and variations are possible within the scope and spirit of the above teachings. It therefore is to be understood that within the scope of the appended claims the invention may be practiced other than as specifically described.

What is claimed as new and desired to be secured by Letters Patent of the United States is:

1. A support for spaced conductor bars, comprising:
   a substantially "U" shaped member of conformable absorbent material impregnated with a hardenable resin cured to a rigid state, said substantially "U" shaped member of conformable absorbent material being disposed between a pair of spaced conductor bars, and
   a member of rigid material being mounted within said substantially "U" shaped member to provide support between the spaced conductor bars, said member of rigid material being provided with a surface having a deformation in order to lock said substantially "U" shaped member of conformable absorbent material and said rigid member in position.

2. A support for spaced conductor bars as recited in claim 1 wherein said deformation in said surface of said rigid member is a notch with a barb oriented to prevent withdrawal of said rigid member from said "U" shaped member.

* * * * *